(12) United States Patent
Nabar et al.

(10) Patent No.: US 8,311,137 B1
(45) Date of Patent: Nov. 13, 2012

(54) METHOD FOR DC OFFSET REMOVAL IN OFDM SYSTEMS

(75) Inventors: Rohit U. Nabar, Sunnyvale, CA (US); Hongyuan Zhang, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 825 days.

(21) Appl. No.: 12/354,136

(22) Filed: Jan. 15, 2009

Related U.S. Application Data

(60) Provisional application No. 61/023,284, filed on Jan. 24, 2008.

(51) Int. Cl.
*H04K 1/10* (2006.01)
(52) U.S. Cl. ........ 375/260; 375/267; 375/346; 375/348; 370/206; 370/208
(58) Field of Classification Search .................. 375/147, 375/260, 267, 319, 343, 344, 346, 347, 348, 375/349; 370/208, 210, 317, 344, 206; 455/232.1, 455/296
See application file for complete search history.

(56) References Cited

U.S. PATENT DOCUMENTS

| | | | | |
|---|---|---|---|---|
| 6,952,394 | B1 * | 10/2005 | Kim et al. ..................... | 370/208 |
| 7,324,609 | B1 * | 1/2008 | Hwang et al. ................. | 375/319 |
| 7,539,475 | B2 * | 5/2009 | Laroia et al. .................. | 455/296 |
| 7,751,487 | B2 * | 7/2010 | Iida ............................... | 375/260 |
| 7,782,750 | B2 * | 8/2010 | Yamaura et al. .............. | 370/206 |
| 2005/0025041 | A1 * | 2/2005 | Marsili ......................... | 370/208 |
| 2005/0111525 | A1 * | 5/2005 | Driesen et al. ................ | 375/147 |

* cited by examiner

*Primary Examiner* — David Ometz
*Assistant Examiner* — Fitwi Hailegiorgis

(57) ABSTRACT

Systems and methods for removing a DC offset from an orthogonal frequency division multiplexed (OFDM) signal transmitted over a plurality of subcarrier frequencies. The system includes a receiver. The system further includes a high pass DC component filter configured to reduce a DC component of the orthogonal frequency division multiplexed signal, the high pass DC component filter shaping noise in the orthogonal frequency division multiplexed signal which results in a non-uniform power spectral density of the noise across the plurality of subcarrier frequencies. The system further includes a noise whitener configured to compensate for the noise shaping by the high pass DC component filter by normalizing the non-uniform power spectral density of the noise across the plurality of subcarrier frequencies.

10 Claims, 5 Drawing Sheets

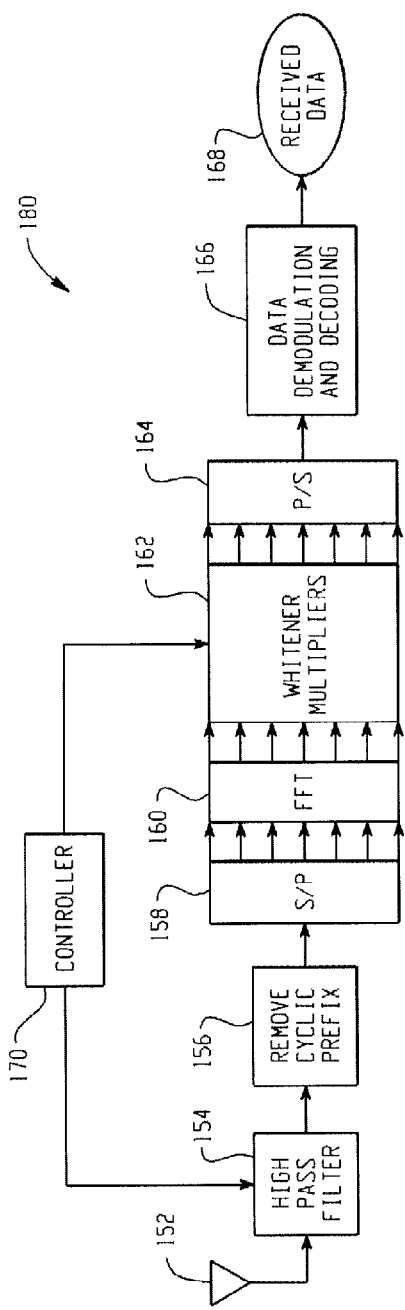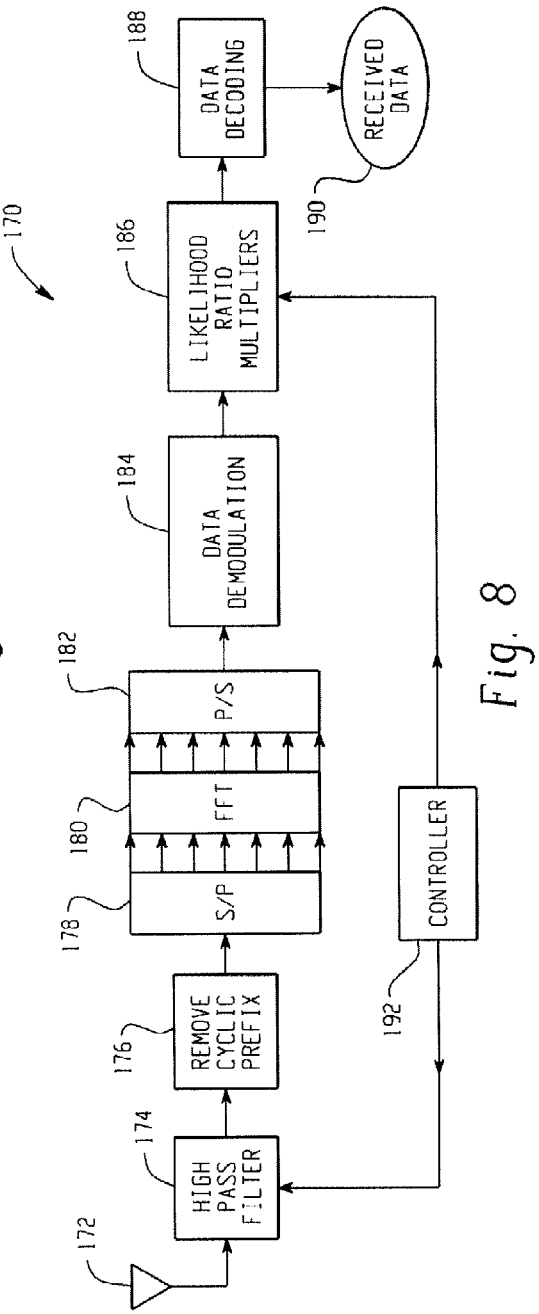

METHOD FOR DC OFFSET REMOVAL IN OFDM SYSTEMS

CROSS-REFERENCE TO RELATED APPLICATIONS

This application claims priority from U.S. Provisional Patent Application No. 61/023,284, filed on Jan. 24, 2008, and entitled "A Method for DC Offset Removal in OFDM Systems," the entirety of which is incorporated herein by reference

FIELD

The technology described in this patent document relates generally to signal processing and more particularly to orthogonal frequency division multiplexed signal processing.

BACKGROUND

Orthogonal frequency division multiplexing (OFDM) is one of the modulations of choice for high data rate, high performance communications systems. In an OFDM system, bandwidth is divided into closely spaced orthogonal subcarriers, also referred to as tones, which are modulated with data symbols. The transmitted data is divided into several parallel data streams or channels, one for each sub-carrier. Each sub-carrier is modulated with a modulation scheme, such as quadrature amplitude modulation or phase shift keying, at a low symbol rate, maintaining total data rates similar to conventional single-carrier modulation schemes in the same bandwidth. An OFDM system is able to eliminate inter-symbol interference (ISI) in channels based on a large bandwidth-delay spread product. This spread enables OFDM systems to cope with severe channel conditions. Channel equalization is simplified because OFDM may be viewed as using many slowly-modulated narrowband signals rather than one rapidly-modulated wideband signal. The low symbol rate makes the use of a guard interval between symbols affordable, making it possible to handle time-spreading and eliminate ISI. These advantages simplify equalizer design and have resulted in adoption of OFDM in several standards including: IEEE 802.11a/g/n, IEEE 802.16e, and 3G-LTE.

Typically, in an OFDM system, no data is transmitted on the DC subcarrier. However, injection of a DC component may occur at the receiver due to impairments. OFDM systems require accurate frequency synchronization between the receiver and the transmitter because with frequency deviation, the sub-carriers will not be orthogonal, potentially resulting in inter-carrier interference. The injection of such a DC component in conjunction with any uncertainty in a carrier frequency offset (CFO) may limit performance of a communication system.

SUMMARY

In accordance with the teachings provided herein, systems and methods are provided for removing a DC offset from a received orthogonal frequency division multiplexed (OFDM) signal transmitted over a plurality of subcarrier frequencies. The system may include an OFDM signal receiver and a high pass DC component filter configured to reduce a DC component of the OFDM signal. The high pass DC component filter may shape noise in the received OFDM signal resulting in a non-uniform power spectral density of the noise across the plurality of subcarrier frequencies such that a combination of the non-uniform power spectral density of the noise across the plurality of subcarrier frequencies and a carrier frequency offset (CFO) degrades receiver performance. The system may further include a noise whitener configured to compensate for noise shaping by the high pass DC component filter by normalizing a power spectral density of noise across the plurality of subcarrier frequencies.

The noise whitener may include a noise whitening multiplier. The noise whitening multiplier may multiply signals received on each subcarrier frequency by a subcarrier specific whitening factor configured to normalize the power spectral density of the noise across the plurality of subcarrier frequencies. The subcarrier specific whitening factor for a subcarrier frequency may be dependent upon a noise power for the subcarrier frequency, and the subcarrier specific whitening factor for a subcarrier frequency may be equal to one divided by the square root of the noise power for the subcarrier frequency.

The system may further include a decoder configured to determine a likelihood ratio for each bit on each subcarrier frequency. The likelihood ratio identifies a probability that a bit is a '1' or a probability that a bit is a '0'. The noise whitener may be configured to multiply the likelihood ratio for each bit by a subcarrier specific scaling factor to generate a modified likelihood ratio for each bit. The subcarrier specific whitening factor may be inversely proportional to a noise power for the subcarrier frequency. The likelihood ratio may be a log likelihood ratio.

The high pass DC component filter may include a plurality of subfilters. The subfilters may be configured such that the sum of the filter coefficients of the plurality of subfilters is equal to zero. The filter length of the plurality of subfilters may be configured such that the effective channel delay is not increased beyond an OFDM cyclic prefix interval. The high pass DC component filter and the noise whitener may be bypassable. The system may be configured to bypass the DC component filter and the noise whitener when a bypass criterion is present. Example bypass criteria include a DC magnitude in the OFDM signal being below a threshold; a CFO being above a threshold; and a CFO being below a threshold. The noise whitener may be bypassed for one or more subcarrier frequencies. The OFDM signal may be a signal in compliance with a standard such as IEEE 802.11a; IEEE 802.11g; IEEE 802.11n; IEEE 802.16e; or 3G-LTE.

As another example, a system for removing a DC offset from a received OFDM signal transmitted over a plurality of subcarrier frequencies may include an OFDM signal receiver and a high pass DC component filter configured to reduce a DC component of the received OFDM signal to generate a first filtered signal. The system may further include a cyclic prefix remover to remove a cyclic prefix from the first filtered signal to generate a second filtered signal. A series to parallel converter may be included for converting the second filtered signal to a parallel representation of the second filtered signal. A fast Fourier transformer may also be included to apply a fast Fourier transform to the parallel representation of the second filtered signal to generate a transformed signal. Further, a noise whitener configured to operate on the transformed signal to compensate for noise shaping by the high pass DC component filter by normalizing a power spectral density of noise across the plurality of subcarrier frequencies may be included.

As a further example, a method for removing a DC offset from a received OFDM signal transmitted over a plurality of subcarrier frequencies may include the steps of receiving an OFDM signal and reducing a DC component of the received OFDM signal using a high pass filter. The method may further include compensating for noise shaping by the high pass filter by normalizing a power spectral density of noise across the plurality of subcarrier frequencies using a noise whitener.

As yet another example, a method of removing a DC offset from a received OFDM signal transmitted over a plurality of subcarrier frequencies may include receiving an OFDM signal and reducing a DC component of the received OFDM signal using a high pass filter to generate a first filtered signal. The method may remove a cyclic prefix from the first filtered signal to generate a second filtered signal. The second filtered signal may be converted to a parallel representation of the second filtered signal, and a fast Fourier transform may be applied to the parallel representation to generate a transformed signal. The method may further compensate for noise shaping by the high pass filter using a noise whitener configured to normalize a power spectral density of noise across the plurality of subcarrier frequencies.

BRIEF DESCRIPTION OF THE DRAWINGS

FIG. 7 is a block diagram of an OFDM receiver having a controllable high pass DC component filter and a controllable set of whitener multipliers.

FIG. 8 is a block diagram of an OFDM receiver having a controllable high pass DC component filter and a controllable set of likelihood ratio multipliers.

DETAILED DESCRIPTION

Figure 1:
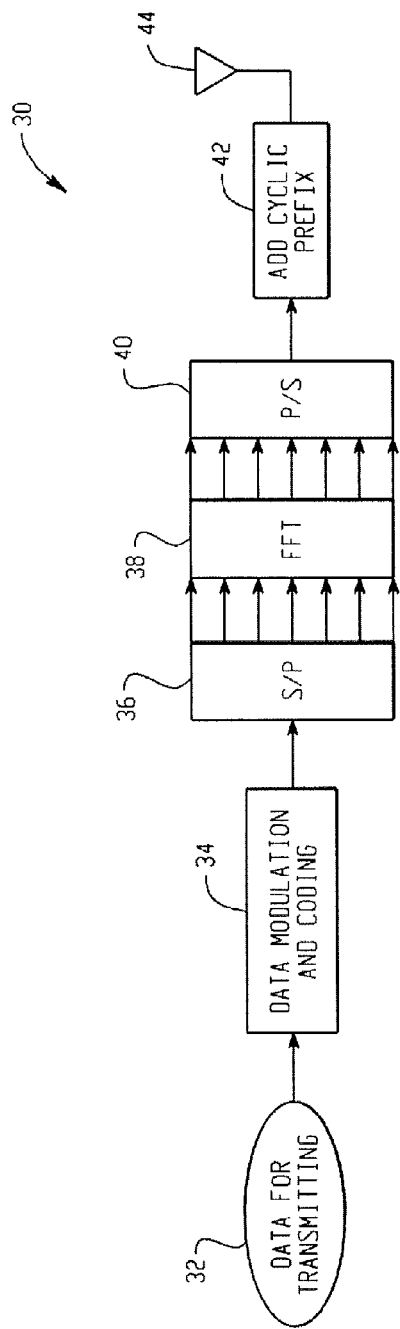
FIG. 1 is a block diagram of an OFDM transmitter configuration.

FIG. 1 is a block diagram of an OFDM transmitter configuration. Data to be transmitted 32 is received by a data modulating and coding block 34. A modulated and coded signal output by the data modulating and coding block 34 is received by a series to parallel converter 36 that splits the modulated, coded signal into subcarrier component parts, enabling parallel processing of the subcarrier component parts. These subcarrier component parts have an inverse fast Fourier transform 38 applied to prepare for transmission by converting the encoded signal from the frequency domain to the time domain. Following application of the inverse fast Fourier transform 38, the signal is collapsed to a single line via a parallel to series converter 40. A cyclic prefix 42 is added to the signal, and the signal is transmitted through an antenna 44.

One key principle of OFDM is that low symbol rate modulation schemes suffer less from ISI losses. Because the duration of each symbol is long, it is feasible to insert a guard interval between the OFDM symbols, which aids in the elimination of ISI. The cyclic prefix, which is translated during the guard interval, consists of the end of the OFDM symbol copied into the guard interval. The guard interval is transmitted followed by the OFDM symbol. A repeat of the end of the OFDM symbol is transmitted during the guard interval so that the receiver will integrate over an integer number of sinusoid cycles for each of its multipaths during OFDM demodulation with the FFT.

Figure 2:
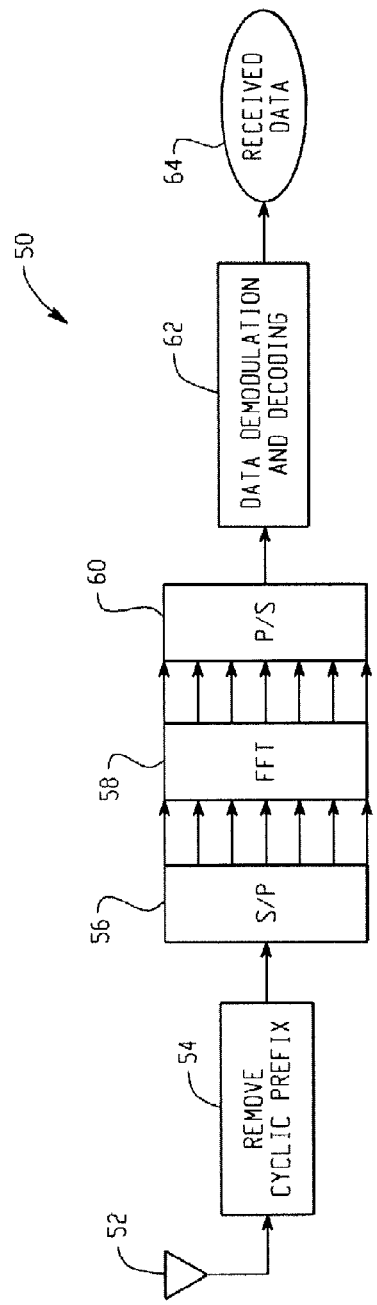
FIG. 2 is a block diagram of an OFDM receiver configuration.

FIG. 2 is a block diagram of an OFDM receiver configuration. Data is received and sampled by an antenna 52, and the cyclic prefix 54 described above is removed. The serial signal is broken apart into its components by subcarrier by a series to parallel converter 56 which enables parallel processing by the fast Fourier transform module 58. The fast Fourier transform module 58 applies a fast Fourier transform to the components to transform the components from the time domain to the frequency domain, and the components are combined into a serial signal by a parallel to series converter 60. The serial signal is then processed by a data demodulation and decoding block 62 which identifies the received data 64 from the processed input signal received by the antenna 52.

The samples of the signal received by the antenna 52 may be represented by the following formula:

$$y[n]=x[n]e^{j(\omega+\Delta\omega)n}+D+z[n].\qquad\text{(eq. 1)}$$

'D' is the DC offset introduced at the receiver. '$\omega+\Delta\omega$' is the normalized (by sampling frequency) radian carrier frequency offset (CFO), where '$\omega$' is the CFO estimated by the receiver and '$\Delta\omega$' is the residual unknown CFO. $x[n]$ represents complex-valued time-domain baseband samples of the received waveform, and $z[n]$ identifies additive noise samples.

Alone, the DC offset introduced at the receiver tends to not have a large detrimental effect on receiver performance. However, the combination of the DC offset with the addition of any uncertainty as to a carrier frequency offset where the exact transmission frequency is unknown to the receiver tends to cause significant adverse effects in receiver functionality.

Figure 3:
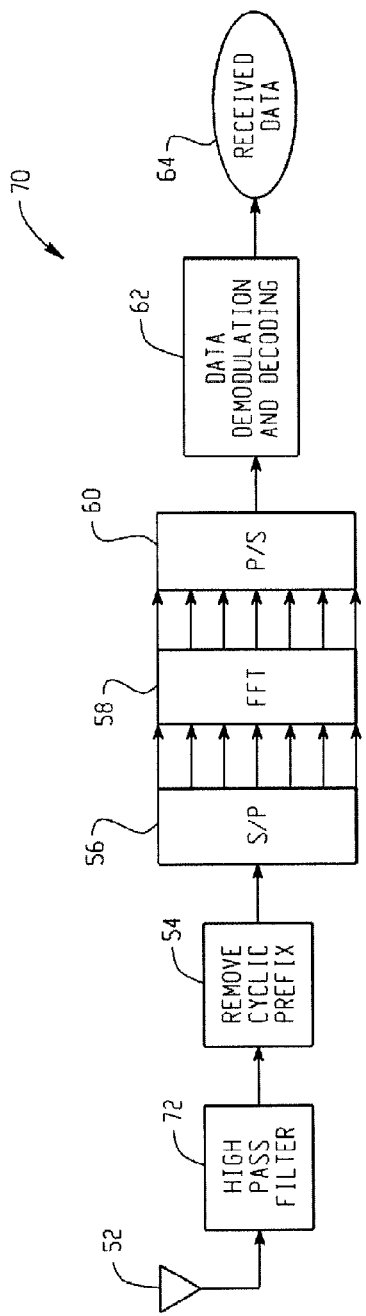
FIG. 3 is a block diagram of an OFDM receiver configuration that includes a high pass DC component filter for removing a DC component of the received signal.

To combat the distortive effects of the combination of an uncertain CFO with a DC offset, a high pass DC component filter 72 may be added to the receiver. FIG. 3 is a block diagram of an OFDM receiver configuration that includes a high pass DC component filter 72 for removing a DC component of the received signal. A transmitted signal is received and sampled by an antenna 72 and propagated to the high pass DC component filter 72. The high pass DC component filter 72 minimizes the DC offset that may be introduced by the receiver 52. Following removal of the DC offset, the cyclic prefix may be removed at 54 and the serial signal may be converted to a parallel representation of its subcarriers by a series to parallel converter 56. A fast Fourier transform is applied to the parallel representation at 58 to transform the signals to the frequency domain, and the parallel signal is converted to a serial signal by a parallel to series converter 60. The serial data signal undergoes data demodulation and decoding 62 and received data 64 is output by the receiver 70.

Figure 4:
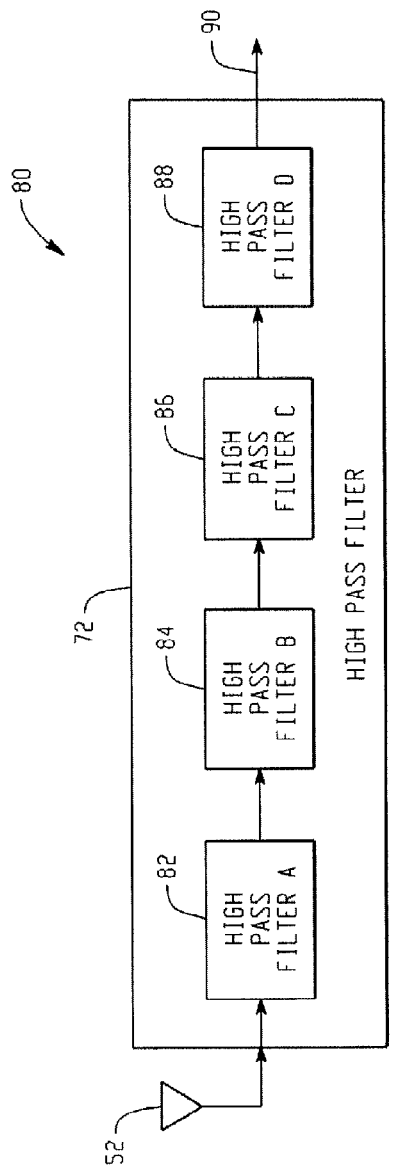
FIG. 4 is a block diagram of an example high pass filter.

FIG. 4 is a block diagram of an example high pass component filter 72. The high pass DC component filter 72 may be made up of a plurality of individual high pass filters 82, 84, 86, 88 that condition the signal received and sampled by the receiver 52. Following filtering by the plurality of individual high pass filters 82, 84, 86, 88, the high pass DC component filter 72 outputs a filtered representation of the received signal to downstream circuitry as shown at 90.

The high pass DC component filter 72 is configured to minimize or zero the DC component of the received data signal. The high pass DC component filter 72 may be implemented in several different configurations, including the configuration depicted in FIG. 4. The filtered signal output from the high pass DC component filter 72 may be represented by the following formula:

$$\tilde{y}[n] = \sum_{l=0}^{L} q[l]y[n-l]. \qquad \text{(eq. 2)}$$

q[l], for l=0, 1, 2, ..., L, represents the filter coefficients that are subject to the constraint:

$$\sum_{i=0}^{L} q[l] = 0,$$

and ỹ[n] represents the filtered received signal. It may be desirable to implement a filter having a length (L+1) that is small enough so as to not increase the effective channel delay spread beyond the OFDM cyclic prefix interval (i.e., the guard interval). A w=[1−1] filter may, for example, be used as a high pass DC component filter.

Following receipt of the transmitted signal and filtering of the DC component of the received signal, a fast Fourier transform is performed to return the received signal to the frequency domain. CFO compensation is then performed by the data demodulation hardware or software in the process of capturing the data encoded on the received signal. Following the fast Fourier transform operation, the transformed signal may be represented as:

$$\hat{y}[n] = \tilde{y}[n]e^{j\omega n}, \qquad \text{(eq. 3)}$$

where ŷ[n] represents the demodulated received signal, ỹ[n] represents the filtered received signal, and $e^{-j\omega n}$ represents the carrier frequency offset correction. The demodulation process seeks to recover ŷ[n] representing the received signal demodulated from its carrier frequency. As described above with reference to eq. 1, the actual carrier frequency offset for a subcarrier is made up of a first carrier frequency offset estimated by the receiver plus a delta-frequency representing any deviation from that estimated offset in the actual carrier frequency offset.

Detection of and compensation for the above described delta-frequency in the actual carrier frequency captured by the receiver is not a problem in scenarios where a DC offset is not present and the noise power is uniform across all of the subcarrier frequencies. Theoretically, neither of these issues is a problem as no data is typically transmitted over the DC frequency in an OFDM scenario, and the additive noise present at the receiver tends to have equal power at all subcarrier components. However, as described above, a DC offset is often introduced to the signal due to impairments in the receiver. The DC offset may be addressed as described above utilizing a high pass DC component filter (e.g., high pass DC component filter 72).

The DC offset filtering removes one of the demodulation impairments described above. However, the filtering may introduce a second impairment. More specifically, the removal of the DC offset via the high pass DC component filter may have a noise shaping effect over the different subcarrier frequencies making the noise power non-uniform. The post-fast Fourier transform input-output relationship for OFDM may be represented by the following equation:

$$Y[k] = S[k]H[k] + N[k] \text{ for } k=0, 1, 2, \ldots, N-1, \qquad \text{(eq. 4)}$$

where Y[k] is the signal received on the k-th subcarrier, N is the FFT size, S[k] is the data symbol transmitted on the k-th subcarrier, H[k] is the channel gain for the k-th subcarrier, and N[k] is the additive noise for the k-th subcarrier having a power of $P_k$. As described above, demodulation may be successfully accomplished where the power spectral density of the noise is flat. (i.e., $P_k = P_j \ \forall \ k, j$). However, any noise shaping introduced by the DC component filtering may introduce a non-uniform power spectral density of the noise that may need to be accounted for when demodulating and decoding the data signals.

Figure 5:
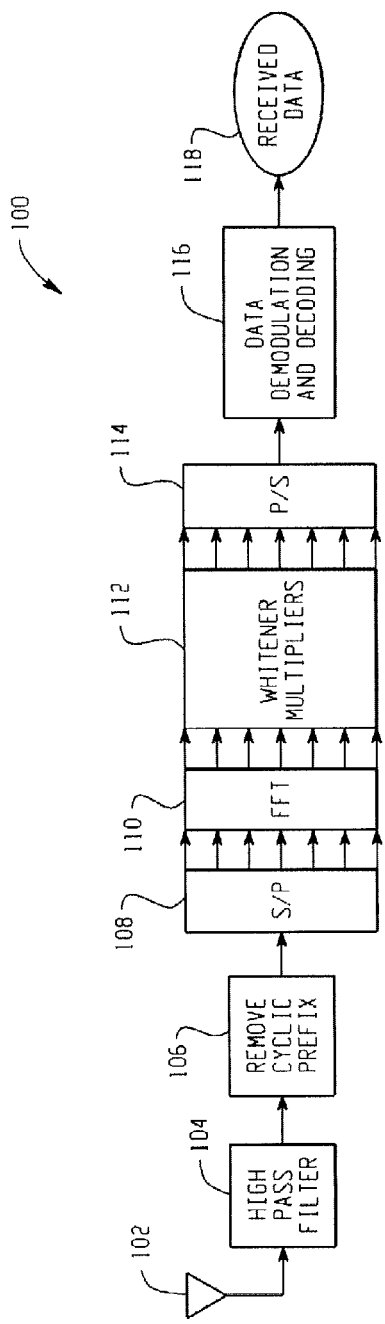
FIG. 5 is a block diagram of an OFDM receiver that includes a high pass DC component filter and a set of whitener multipliers.

FIG. 5 depicts an example system for dealing with a non-uniform noise power density caused by a high pass DC component filter through noise whitening. FIG. 5 is a block diagram of an OFDM receiver that includes a high pass DC component filter 106 and a set of whitener multipliers 112. An OFDM signal is received and sampled as shown at 102. The received signal is processed by a high pass DC component filter 104 to minimize any DC component introduced to the received signal at the receiver. The cyclic prefix is removed at 106, and the subcarriers of the signal are split into a parallel form by a series to parallel converter 108. A fast Fourier transform 110 is applied to the parallel signals to transform the signals to the frequency domain. Following the fast Fourier transform 110, the signals from each of the subcarrier signals are multiplied by a whitener multiplier as shown at 112.

The whitener multipliers 112 restore uniformity of noise across the plurality of channels by multiplying the signal from a subcarrier by a subcarrier specific factor. The subcarrier specific factor is based on a measured noise power for that channel. For example, the signal for channel k, Y[k], may be multiplied by a subcarrier specific factor as shown below to calculate a whitened signal for channel k:

$$Y_P[k] = Y[k](\sqrt{P_k})^{-1}, \qquad \text{(eq. 4)}$$

where $P_k$ is the noise power for subcarrier k, and $Y_p[k]$ is the whitened signal for a subcarrier. When applied to each of the subcarriers at 112 following the fast Fourier transform 110, the whitener multipliers flatten the noise power spectral density across all of the subchannels.

Following whitening, the signal processing has compensated the impairments successfully. The DC offset has been removed, and the noise power is equal across all subcarriers. The system then continues with nominal decoding procedures. The whitened signals are converted to a serial form by a parallel to series converter 114, and demodulation and decoding operations 116 are then performed on the serial signal to detect and output received data 118. It should be noted that other whitener multipliers that consider the noise power of each subchannel may be successfully implemented by one skilled in the art.

Figure 6:
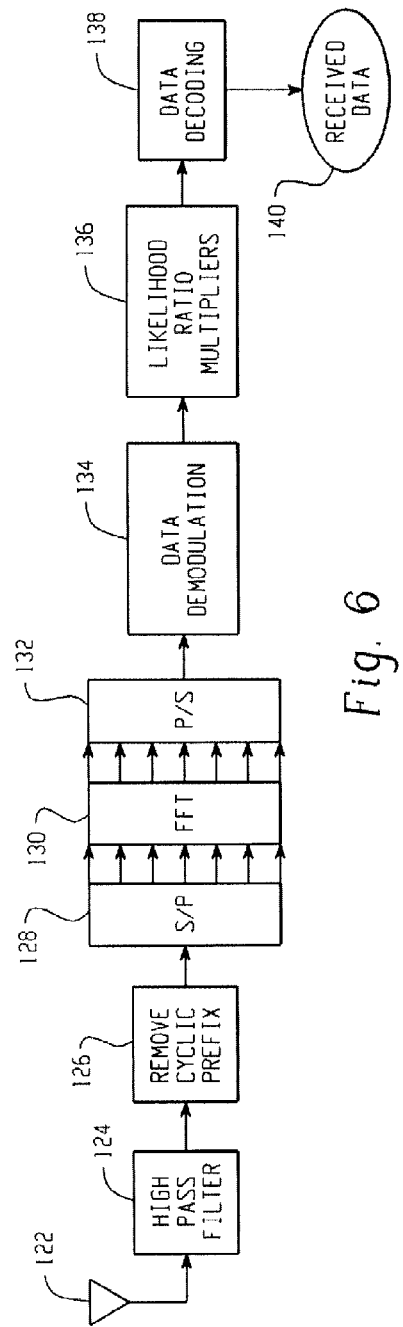
FIG. 6 is a block diagram of an OFDM receiver than includes a high pass DC component filter and a set of likelihood ratio multipliers.

FIG. 6 depicts another example method for addressing a non-uniform noise power across subchannels in an OFDM system. FIG. 6 is a block diagram of an OFDM receiver that includes a high pass DC component filter 124 and a set of likelihood ratio multipliers 136. An OFDM signal is received and sampled as illustrated at 122. The high pass DC component filter 124 minimizes any DC component that may be introduced into the signal at the receiver 122. The high pass DC component filter 124 may shape the noise across the subchannels such that the noise power is non-uniform. The cyclic prefix is removed at 126, and the signal is broken into subchannel components by a series to parallel converter 128. A fast Fourier transform 130 is applied to the subchannel components, and the subchannel components are changed to a serial form by a parallel to series converter 132.

The signal, which may have a non-flat noise power spectral density across the subchannels, is then received and processed by the data demodulation block 134. As noted previously, proper data demodulation may not be possible in OFDM systems having non-uniform noise power spectral densities without some compensation. The system depicted in FIG. 6 applies this compensation after the data demodulation block 134. The data demodulation block 134 calculates bit metrics for each bit on each subchannel. A bit metric represents a probability that a bit is a '1' or a '0'. Bit metrics are often referred to as likelihood ratios. For example, a log likelihood ratio may be used to calculate a probability that a bit is a '1' or a '0'. To account for spectral shaping of the noise that may be caused by the high pass DC component filter 124, the bit metrics may be modified by multiplying the bit metrics by a subcarrier specific likelihood ratio multiplier value. For example, the bit metric for the i-th transmitted bit, b[i], may be modified as follows to calculate a whitened bit metric, bp[i]:

$$b_P[i] = \frac{b[i]}{P_{k(i)}}, \qquad \text{(eq. 5)}$$

where $P_{k(i)}$ is the noise power corresponding to the subcarrier on which the i-th bit is transmitted. The modification of the bit metrics according to a subcarrier specific likelihood ratio multiplier based on the noise power for that subcarrier effectively smoothes the noise power across the plurality of subcarriers resulting in a similar error rate performance as the example system of FIG. 5. The whitened bit metrics are then propagated to the data decoding block 138 which extracts and outputs the received data 140. Other likelihood ratio multipliers that consider the noise power of each subchannel may be successfully implemented.

The noise power spectral density, $P_k$, shaped by the high pass DC component filter 124 that is utilized in the above applications may be estimated as follows. For an arbitrary filter, q, the noise power spectral density is given by the following formula:

$$P_k = \sum_{l=0}^{L} |q[l]|^2 + \frac{2}{N} R\left( \sum_{l=0}^{L-1} \sum_{m=l+1}^{L} q[l]q[m]^*(N-|l-m|)e^{j\left(\frac{2\pi k|l-m|}{N}+|l-m|\omega\right)} \right), \qquad \text{(eq. 6)}$$

where q[l] represents the high pass DC component filter coefficients and N represents the number of tones in the fast Fourier transform. For a small CFO and a filter having a length L, the noise power spectral density may be estimated as:

$$P_k \approx \sum_{l=0}^{L} |q[l]|^2 + \frac{2}{N} R\left( \sum_{l=0}^{L-1} \sum_{m=l+1}^{L} q[l]q[m]^*(N-|l-m|)e^{j\left(\frac{2\pi k|l-m|}{N}\right)} \right). \qquad \text{(eq. 7)}$$

The joint effects of CFO compensation and the filtering differential operation result in the filtered noise, $z_f[n]$ that may be represented as:

$$z_f[n] = e^{-j\omega n}(z[n] - z[n-1]). \qquad \text{(eq. 8)}$$

The noise power spectral density may then be computed as:

$$P_k = 2 - \frac{2(N-1)}{N} \cos\left(\omega + \frac{2\pi k}{N}\right), \qquad \text{(eq. 9)}$$

which may be approximated as follows for small ω:

$$P_k \approx 2 - \frac{2(N-1)}{N} \cos\left(\frac{2\pi k}{N}\right). \qquad \text{(eq. 10)}$$

FIG. 7 is a block diagram of an OFDM receiver having a controllable high pass DC component filter 154 and a controllable set of whitener multipliers 162. The configuration of FIG. 7 functions similarly to the example of FIG. 5. An OFDM signal is received and sampled by the receiver 152. The signal is filtered by the high pass DC component filter 154 to remove any DC component introduced by the receiver. The cyclic prefix is removed 156, and the signal is converted to a parallel form by a series to parallel converter 158 such that a fast Fourier transform 160 may be applied to the subcarrier components. Whitener multipliers 162 are applied to the outputs of the fast Fourier transform 160 as described with respect to FIG. 5 to flatten the noise power spectral density across the plurality of subcarriers. The whitened signal is then converted to a serial form by a parallel to series converter 164, and the whitened data is demodulated, decoded 166 and outputted as received data 168.

The configuration of FIG. 7 further includes a controller 170. The controller 170 is configured to adaptively control the high pass DC component filter 154 and the whitener multipliers 162 such that these components may be bypassed when desirable. For example, the controller 170 may bypass the high pass DC component filter 154 if the controller 170 detects that there is little or no DC component being introduced at the receiver 152. Because the filtering of the DC component tends to introduce unwanted noise shaping that may need to be addressed by the whitener multipliers, bypassing the filtering stage when the filtering stage is not required may be beneficial. Other situations where it may be desirable to bypass the high pass filter 154 and whitener multipliers 162 may include situations where the CFO is too high or too low, as well as other scenarios. Additionally, the controller 170 may instruct the whitening multipliers 162 to apply the whitening operations to only a subset of the fast Fourier transform outputs based on the shape of the filter-induced power spectral density of the noise.

FIG. 8 is a block diagram of an OFDM receiver having a controllable high pass DC component filter 174 and a controllable set of likelihood ratio multipliers 186. The configuration of FIG. 8 functions similarly to the circuit described with respect to FIG. 6. An OFDM signal is received and sampled by a receiver 172. The signal undergoes high pass DC component filtering to remove any DC component introduced by the receiver. The cyclic prefix 176 is removed and the signal is broken into subcarrier components by a series to parallel converter 178. A fast Fourier transform 180 is applied to the subcarrier components to convert the components to the frequency domain, and the subcarrier components are recombined into a serial form by a parallel to series converter 182. Standard demodulation operations are applied as shown at 184. Likelihood ratio multipliers 186 are then applied to the bit metrics calculated and outputted by the data demodulation block 184 as described with respect to FIG. 6. The whitened bit metrics are then input to the data decoder 188 which outputs the received data 190.

The configuration of FIG. 8 further includes a controller 192. The controller 192 is configured to adaptively control the high pass DC component filter 174 and the likelihood ratio multipliers 186 such that these components may be bypassed when desirable. For example, the controller 192 may bypass the high pass DC component filter 174 if the controller 192 detects that there is little or no DC component being introduced at the receiver 152. Because the filtering of the DC component tends to introduce unwanted noise shaping that may need to be addressed by the likelihood ratio multipliers, bypassing the filtering stage when it is not required may be beneficial. Other situations where it may be desirable to bypass the high pass filter 174 and likelihood multipliers 186 may include situations where the CFO is too high or too low, as well as other scenarios. Additionally, the controller 192 may instruct the likelihood multipliers 186 to apply the whitening operations to only a subset of the data demodulation outputs based on the shape of the filter-induced power spectral density of the noise.

Figures 9, 10:
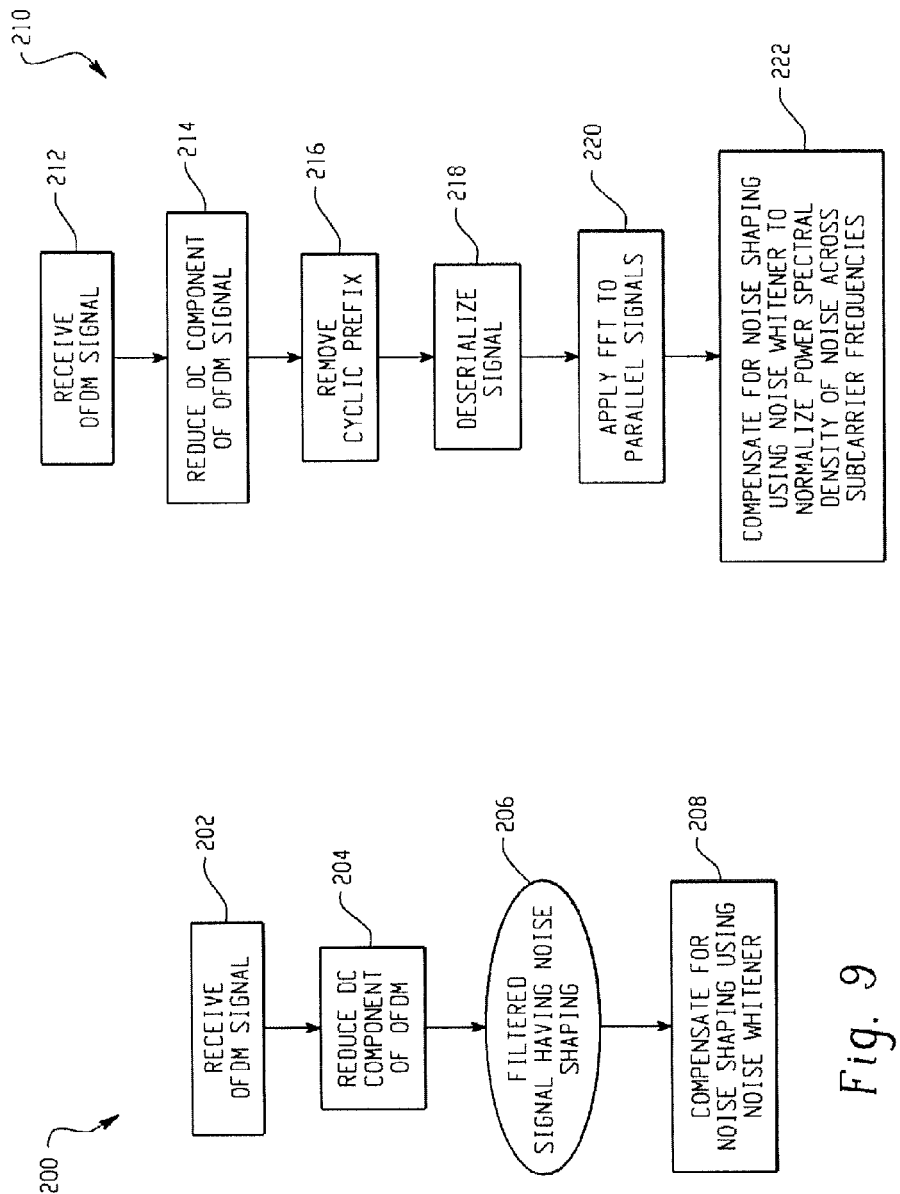
FIG. 9 is a flow diagram depicting a process for reducing a DC component of an OFDM signal and compensating for noise shaping of the OFDM signal.
FIG. 10 is a flow diagram depicting a process for reducing a DC component of an OFDM signal and compensating for noise shaping of the OFDM signal.

FIG. 9 is a flow diagram depicting a process for reducing a DC component of an OFDM signal and compensating for noise shaping of the OFDM signal. An OFDM signal is received as illustrated at 202. A high pass DC component filter is configured to reduce a DC component of the received OFDM signal as shown at 204. The high pass DC component filter may shape noise in the OFDM signal, as shown at 206, resulting in a non-uniform power spectral density of the noise across the plurality of subcarrier frequencies such that the non-uniform power spectral density of the noise across the plurality of subcarrier frequencies and a CFO degrades performance of the receiver. At 208, a noise whitener compensates for noise shaping by the high pass DC component filter by normalizing a power spectral density of noise across the plurality of subcarrier frequencies.

FIG. 10 is a flow diagram depicting a process for reducing a DC component of an OFDM signal and compensating for noise shaping of the OFDM signal. An OFDM signal is received 212, and a DC component of the OFDM signal is reduced 214 using a high pass filter to generate a first filtered signal. A cyclic prefix is removed at 216 from the first filtered signal to generate a second filtered signal. The second filtered signal is deserialized at 218 to generate a parallel representation of the second filtered signal. A fast Fourier transform is then applied 220 to the parallel representation of the second filtered signal to generate a transformed signal. Compensation for noise shaping by the high pass filter is then applied using a noise whitener as shown at 222 to normalize a power spectral density of noise across the plurality of subcarrier frequencies.

The above described concepts may be implemented in a wide variety of applications—e.g., wireless devices, and other devices that support wireless communication. This written description uses examples to disclose the invention, including the best mode, and also to enable a person skilled in the art to make and use the invention. It should be noted that the systems and methods described herein may be equally applicable to other frequency modulation encoding schemes. The patentable scope of the invention may include other examples that occur to those skilled in the art.

It is claimed:

1. A system comprising:
a receiver to receive an orthogonal frequency division multiplexed signal, the orthogonal frequency division multiplexed signal having been transmitted over a plurality of subcarrier frequencies;
a high pass DC component filter to reduce a DC component of the orthogonal frequency division multiplexed signal by shaping noise in the orthogonal frequency division multiplexed signal, wherein the shaping of the noise in the orthogonal frequency division multiplexed signal results in a non-uniform power spectral density of the noise across the plurality of subcarrier frequencies, wherein the high pass DC component filter includes a plurality of subfilters, wherein a sum of filter coefficients of the plurality of subfilters is equal to zero, and wherein a filter length of the plurality of subfilters does not increase an effective channel delay beyond an orthogonal frequency division multiplexing cyclic prefix interval; and
a noise whitener to normalize the non-uniform power spectral density of the noise across the plurality of subcarrier frequencies.

2. The system of claim 1, wherein the noise whitener comprises a noise whitening multiplier;
wherein the noise whitening multiplier multiplies signals received on each subcarrier frequency by a subcarrier specific whitening factor, the subcarrier specific whitening factor being configured to normalize the non-uniform power spectral density of the noise across the plurality of subcarrier frequencies.

3. The system of claim 2, wherein the subcarrier specific whitening factor for a subcarrier frequency is dependent upon a noise power for the subcarrier frequency.

4. The system of claim 1, wherein the orthogonal frequency multiplexed signal is a signal in compliance with a standard selected from the group consisting of: IEEE 802.11a; IEEE 802.11g; IEEE 802.11n; IEEE 802.16e; and 3G-LTE.

5. A system comprising:
a receiver to receive an orthogonal frequency division multiplexed signal, the orthogonal frequency division multiplexed signal having been transmitted over a plurality of subcarrier frequencies;
a high pass DC component filter to reduce a DC component of the orthogonal frequency division multiplexed signal by shaping noise in the orthogonal frequency division multiplexed signal, wherein the shaping of the noise in the orthogonal frequency division multiplexed signal results in a non-uniform power spectral density of the noise across the plurality of subcarrier frequencies; and
a noise whitener to normalize the non-uniform power spectral density of the noise across the plurality of subcarrier frequencies;
wherein the system is configured to bypass the high pass DC component filter and the noise whitener when a bypass criteria is present from the group of bypass criteria consisting of: a DC magnitude in the received orthogonal frequency division multiplexed signal is below a first threshold value; a carrier frequency offset is above a second threshold; the carrier frequency offset is below a third threshold.

6. The system of claim 5, wherein the noise whitener comprises a noise whitening multiplier;
wherein the noise whitening multiplier multiplies signals received on each subcarrier frequency by a subcarrier specific whitening factor, the subcarrier specific whitening factor being configured to normalize the non-uniform power spectral density of the noise across the plurality of subcarrier frequencies.

7. The system of claim 6, wherein the subcarrier specific whitening factor for a subcarrier frequency is dependent upon a noise power for the subcarrier frequency.

8. The system of claim 5, wherein the orthogonal frequency multiplexed signal is a signal in compliance with a standard selected from the group consisting of: IEEE 802.11a; IEEE 802.11g; IEEE 802.11n; IEEE 802.16e; and 3G-LTE.

9. A method comprising:
   receiving an orthogonal frequency division multiplexed signal, the orthogonal frequency division multiplexed signal having been transmitted over a plurality of subcarrier frequencies;
   reducing a DC component of the orthogonal frequency division multiplexed signal to generate a first signal, wherein reducing the DC component includes shaping noise in the orthogonal frequency division multiplexed signal, wherein the shaping of the noise in the orthogonal frequency division multiplexed signal results in a non-uniform power spectral density of the noise across the plurality of subcarrier frequencies;
   removing a cyclic prefix from the first signal to generate a second signal;
   converting the second signal to a parallel representation of the second signal;
   applying a fast Fourier transform to the parallel representation of the second signal to generate a transformed signal; and
   normalizing the non-uniform power spectral density of the noise across the plurality of subcarrier frequencies that make up the transformed signal, wherein the normalizing comprises multiplying individual signals of the transformed signal by a subcarrier specific whitening factor, the subcarrier specific whitening factor being configured to normalize the non-uniform power spectral density of the noise across the plurality of subcarrier frequencies that make up the transformed signal, and wherein the subcarrier specific whitening factor for a subcarrier is equal to one divided by the square root of the noise power for the subcarrier frequency.

10. The method of claim 9, wherein the orthogonal frequency multiplexed signal is a signal in compliance with a standard selected from the group consisting of: IEEE 802.11a; IEEE 802.11g; IEEE 802.11n; IEEE 802.16e; and 3G-LTE.

\* \* \* \* \*